June 13, 1933.  R. K. LEE  1,913,936
MOTOR MOUNTING
Filed Dec. 17, 1930
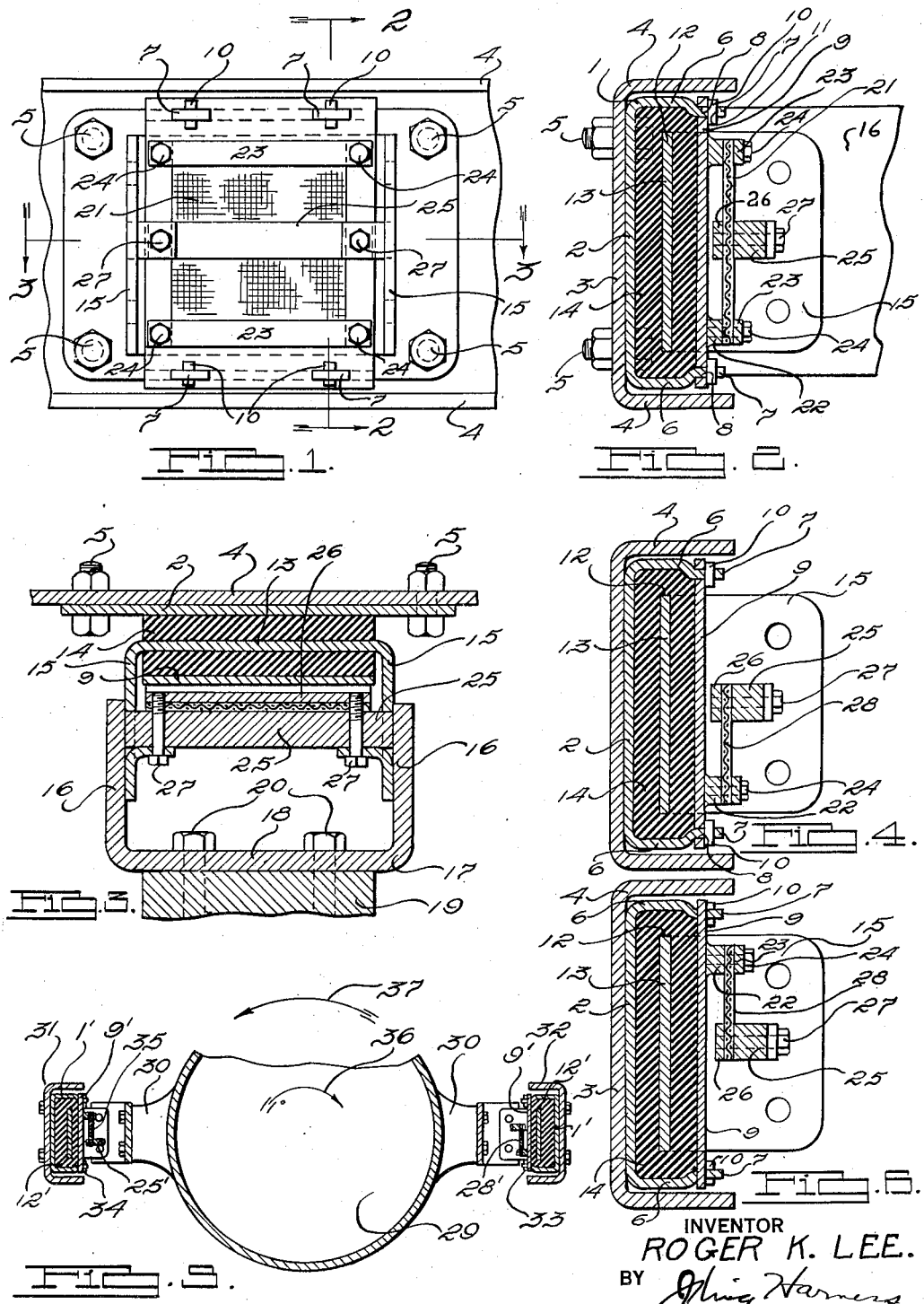
INVENTOR
ROGER K. LEE.
BY
ATTORNEY Patented June 13, 1933

1,913,936

UNITED STATES PATENT OFFICE

ROGER K. LEE, OF HIGHLAND PARK, MICHIGAN, ASSIGNOR TO CHRYSLER CORPORATION, OF DETROIT, MICHIGAN, A CORPORATION OF DELAWARE

MOTOR MOUNTING

Application filed December 17, 1930. Serial No. 503,056.

This invention relates to an improved resilient mounting and particularly to a mounting of this kind for resiliently supporting an internal combustion engine.

The main objects of the invention are to provide means for controlling the resilient actions of a motor mounting of the type which includes rigid supports for attachment to a motor block and vehicle frame, respectively, having a resilient connecting element; to provide means on a mounting of this kind for limiting the relative movement of one of said supports in one or more predetermined directions so as to either arrest vertical movement of the motor in both directions, or to check rebounding of the motor alone by arresting movement only in one vertical direction; to provide means of this character which will not reduce the sensitivity or capacity of the mountings for absorbing the vibrations that are created by the operation of the engine; and to provide flexible movement checking members, or straps in devices of this character which are comparatively fixed in lengths and non-susceptible of elongation under tension.

A further object of this invention is to provide a pair of improved motor mountings, one at each respectively opposite side of an internal combustion engine, which have movement checking members located so as to arrest the torque reaction to which the housing or block of the engine is subjected during or block of the engine is subjected during the explosion strokes of its pistons and during rotation of its crankshaft and other moving parts.

An illustrative embodiment of the invention is shown in the accompanying drawing, in which:

Fig. 1 is a side elevation of one of my improved mountings.

Fig. 2 is a transverse vertical section taken on the line 2—2 of Fig. 1.

Fig. 3 is a horizontal section taken on the line 3—3 of Fig. 1.

Fig. 4 is a section, similar to Fig. 2, but showing a modified form of my improved mounting.

Fig. 5 is a transverse section of an internal combustion engine assembly illustrating, in section, motor mountings which are constructed and arranged so as to limit the movement of an engine under the direct reactions to which it is subjected during operation.

Fig. 6 is a vertical transverse section of the mounting appearing at the left side of Fig. 5.

The motor mounting illustrated in Figs. 1 to 3 inclusive, includes an outer channel shaped bracket or support 1 having a web 2 which is secured to the web 3 of a side member 4 of a vehicle chassis frame by bolts 5. The support 1 has inwardly extending sides 6 on the extremity of which are formed inwardly offset lugs 7 that are received in slots 8 of a plate 9 which substantially closes the inner open side of the channel shape bracket 1. The plate 9 is held against displacement by wedges 10, or other suitable means which extend through apertures 11 in the lugs 7.

An inner U-shaped bracket or support 12 which has a web 13 located between the web 2 and the plate 9 of the outer support, is yieldably connected to the latter by a rubber medium 14. The web 13 of the inner bracket 12 is located substantially midway between the web 2 and the plate 9 of the outer bracket and it is completely surrounded by a rubber composition which is integrally bonded by vulcanization, or in any other suitable manner, to the inner surfaces of the bracket 1 and plate 9 and to the side and edge surfaces of the web 13 of the inner bracket 12. This rubber connecting medium is preferably placed under an initial compression, either during filling of the space around the web 13 and between the web 2 of the outer bracket and the plate 9 thereof, or by driving the wedges 10 inwardly so as to urge the plate 9 towards the web 2 of the outer bracket.

Respectively opposite sides 15 of the inner U-shaped bracket 12 are secured by bolts, rivets or other suitable means to side portions 16 of a channel shape member 17 that has a thickened web 18 for attachment to a laterally extending arm 19 of a motor block. The member 17 is preferably bolted, as illustrated at 20, to the solid arm 19 in the manner shown in Fig. 4, the relation of the arms to the block or casing of the motor being more clearly illustrated in Fig. 5, which discloses a further development of the invention.

When a vehicle having a motor which is suspended in the above manner and without being provided with means for checking or limiting movement of the motor relative to the chassis frame, encounters road irregularities, the enormous mass of the motor tends to produce excessive movement between the motor and the side members of the chassis frame on which the motor is carried.

As the rubber connecting medium 14 has to be substantially yieldable to insulate the frame from the vibrations which are created during operation of the motor, this medium necessarily allows some relative movement of the motor with respect to the frame. Downward movement of the motor, or engine causes the medium 14 to be placed under tension and as a result, after the motor reaches the bottom of its downward thrust, it is rebounded upwardly above its normal position.

My improved motor mountings are provided with flexible, substantially non-extensible elements 21, preferably comprising rubberized fabric, that are adapted to limit or arrest relative movement between the inner and outer supports 1 and 12 of the mountings without interfering with the vibration absorbing properties of the yieldable connecting mediums between these two brackets. In the form shown in Figs. 1 to 3, a rectangular sheet of rubberized fabric material 21 is located in spaced relation to the plate 9 on the inner side thereof and is secured along its upper and lower edge portions between bars 22 which are welded or otherwise integrally fixed to the plate 9, and clamping members 23 which are held upon the bars 22 by bolts 24. These bars and clamping members extend longitudinally with respect to the side members 4 or channel bars of the chassis frame. The intermediate portions of the rubberized fabric sheet 21 are clamped between a cross member 25 which is carried by, and extends between the sides 15 of the inner U-shaped support 12 of the mounting and a bar 26 that extends longitudinally of the channel bar 4 of the chassis frame between the rubberized fabric element 21 and the plate 9, the bar 26 being secured to the cross member 25 by bolts 27. In this manner, the upper edge portions of the rubberized fabric member 21 are rigidly secured to the structure of the outer bracket of the mounting and the intermediate portions of the element 21 are rigidly secured to the inner bracket 12 of the mounting. The relative movement of the inner and outer brackets of the mounting is limited, checked, or if desired, completely arrested by the flexible member 21 which is substantially non-extensible under tension.

When it is desired to only limit or prevent rebounding of the motor relative to the chassis upon which it is mounted, the mountings may be constructed, as illustrated in Fig. 4. In this case, the plate 9 is provided along its lower edge portion with only one longitudinally extending bar 22 to which the lower edge portions of a flexible, non-extensible element 28, preferably comprising rubberized fabric, is rigidly secured by a clamping bar 23 which is held upon the longitudinal bar 22 by bolts 24. The upper edge portions of the rubberized fabric sheet 28 are clamped between the cross member 25 of the inner U-shaped bracket 12 and the clamping member 26 in the same manner as the intermediate portions of the fabric element 21, shown in Fig. 2 are secured to the inner support 12. With this construction, the motor is free to move downwardly under the restraining action or tension characteristic of the rubber connecting medium 14 and is not limited or otherwise effected by the movement checking member 28, but upon upward rebounding of the motor, the non-extensible element 28 prevents movement of the motor above its normal position or above any predetermined position.

In the form shown in Figs. 5 and 6, an internal combustion engine, diagrammatically illustrated at 29, is provided with laterally extending side arms 30 which are secured by resilient motor mountings to the opposite side members 31 and 32 of a chassis frame. The motor mountings are mainly identical in construction to those illustrated and described above, but they are provided with means for limiting the relative movement of the brackets which the motor mountings include, in such a manner as to oppose the torsional reaction of the block or casing of the motor to rotation of its movable parts during operation.

The motor mounting 33 at the right side of the structure shown in Fig. 5 is practically identical in every detail to that shown in Fig. 4. It has a flexible, non-extensible element 28' which is secured at its upper edge portions to the inner bracket 12' and its lower edge portions are secured to the plate 9' of the outer bracket or support 1' so as to prevent upward movement of the right side of the motor with respect to the side member 32 of the chassis frame.

The motor mounting 34 at the left side of the structure shown in Fig. 5, is provided with a flexible, non-extensible, rubberized fabric member 35 which is secured at its upper edge to the plate 9' of the outer bracket 1' and at its lower edge portion to a cross member 25' of the inner bracket 12'. This construction allows the left side of the motor to move upwardly under the restraining action of the yieldable connecting medium of the mounting, but it limits, or arrests downward movement of the left side of the motor.

Assuming that the crankshaft of the motor rotates in a clockwise direction, as indicated by the arrow 36, the stationary portions of the motor are subjected to a torque reaction which is exerted in the direction of the arrow 37 in Fig. 5. This torque reaction tends to rotate the motor block above the excess of the crankshaft and to raise the right side of the motor and to move the left side thereof downwardly. The flexible, non-extensible rubberized fabric elements 28' and 35 resist rotation of the stationary part or housing of the motor by the torque reaction thereof and prevent excessive displacement of the motor from a normally predetermined position without decreasing the vibration insulating properties of the mountings.

Although but several specific embodiments of this invention have herein been shown and described, it will be understood that various changes in the size, shape and arrangement of parts may be made without departing from the spirit of my invention and it is not my intention to limit its scope other than by the terms of the appended claims.

What I claim is:

1. A mounting of the class described including a pair of rigid supports, a resilient rubber element yieldably connecting said supports together, and a flexible, non-extensible member secured at its respectively opposite extremities to one of said supports and secured to the other support at its intermediate portion.

2. A motor mounting including a bracket for attachment to a motor casing, a support for attachment to a frame structure enveloping a portion of said bracket, a rubber connecting element located between said support and the enveloped portion of said bracket, clamping elements on said bracket and support respectively, and a flexible, comparatively non-extensible member secured at its ends in said clamping elements and adapted to limit relative movement of said supports in a predetermined direction.

3. A motor mounting including a bracket for attachment to a motor casing, a support for attachment to a frame structure enveloping a portion of said bracket, a rubber connecting element located between said support and the enveloped portion of said bracket, a pair of clamping elements, one on said bracket and the other on said support below the clamping member of said bracket, and a flexible, non-extensible strap secured at each end to one of said clamping elements and adapted to arrest rebounding of said bracket with respect to said support.

4. In an internal combustion engine installation, a pair of spaced frame members, an engine located between said frame members, mounting members yieldably securing each side of said engine to one of said supports each including a pair of rigid elements and a resilient connecting element, and means connecting the rigid elements of each mounting member respectively and arranged to hold the opposite sides of said engine against movement in respectively opposite directions under the torque reaction to the rotating parts of said engine.

5. In a motor installation, a pair of spaced frame members, a motor located between said frame members, motor mountings yieldably securing the respectively opposite sides of said motor to said frame members, each including a pair of brackets having a resilient member forming a yieldable connection therebetween, and means on said motor mountings for limiting movement of the opposite sides of said motor in respectively opposite direction so as to resist rotation of said motor under the torque reaction to which it is subjected by the rotating parts of said motor.

6. In a motor installation, a pair of spaced frame members, a motor located between said frame members, motor mountings yieldably securing the respectively opposite sides of said motor to said frame members, each including a pair of brackets having a resilient member forming a yieldable connection therebetween, a pair of flexible, non-extensible elements, one connected to the brackets of each mounting, respectively and each adapted to secure corresponding brackets of the opposite sides of said motor against movement in respectively opposite direction so as to resist rotation of said motor under the torque reaction to which it is subjected by the rotating parts of said motor.

7. In a motor installation, a pair of spaced frame members, a motor located between said frame members, motor mountings yieldably securing the respectively opposite sides of said motor to said frame members, each including a pair of brackets, one rigidly attached to a frame member and the other rigidly attached to the adjacent side of said motor, a check strap secured at its upper end to the bracket of one frame member and its its lower end to the bracket of the adjacent side of said motor, and another strap check attached at its upper end to the motor bracket of the other mounting and at its lower end to the adjacent frame member.

8. A mounting of the class described comprising a U-shaped stamping having lateral flanges securable to an engine, a member embracing the central portion of said U-shaped stamping, rubber between and vulcanized to the adjacent faces of said stamping and member, means for securing said member to a support, and a flexible, comparatively non-extensible element, rigidly secured to said stamping and said member for limiting relative movement thereof in a predetermined direction.

9. A mounting of the class described including a pair of rigid supports each having a releasable clamping element thereon, resilient means yieldably connecting said supports together, and flexible means detachably secured to each of said supports by said clamping elements and adapted to limit relative movement of said supports in predetermined directions independently of said resilient means.

ROGER K. LEE.